Sept. 25, 1962      J. HENRY-BAUDOT      3,056,058
ELECTRICAL ROTATING MACHINES
Filed Sept. 15, 1958

Inventor:
Jacques Henry-Baudot
By Kenyon, Kenyon, Stewart
& Estabrook
Attorneys

United States Patent Office 3,056,058
Patented Sept. 25, 1962

3,056,058
ELECTRICAL ROTATING MACHINES
Jacques Henry-Baudot, Antony, France, assignor, by mesne assignments, to Printed Motors, Inc., New York, N.Y.
Filed Sept. 15, 1958, Ser. No. 760,907
Claims priority, application France Mar. 28, 1958
9 Claims. (Cl. 310—268)

The present invention is a continuation in part of my co-pending application Serial No. 691,434 and concerns improvements in the arrangement of D.C. motors, A.C. generators and rotary converters including a stator member consisting of a plurality of magnetic pole-pieces distributed over a substantially flat ring and of a flat rotor consisting of a winding of printed conductors spread out over the two faces of a thin dielectric or magnetic supporting disc.

The above mentioned co-pending application provides for electrical rotating machines having a plurality of poles and efficiently operating even at relatively low speeds and at relatively low power because of the reduced volume and fair cooling characteristic of the structure.

It is therefore a broad object of the present invention to further improve the stator field structure and the rotor of such rotating machines improving their efficiency for very low powers, and providing rotating parts of very small inertia.

More specifically, the inductor of the co-pending application had as many permanent magnets as there were magnetic poles in the machine, and these magnets were distributed around a discoidal magnetic yoke, each magnet ending in a pole piece facing the annular air-gap of the machine.

The present invention provides an improved field structure in which the two sets of pole pieces of opposite polarity are magnetized from a single source of magnetizing flux.

A more specific object of the invention is to provide pole pieces for the inductor or stator member in the form of portions cut in plates of magnetic material which form separate yokes for the respective poles of a single source of magnetizing flux, such as a single permanent magnet which is cylindrical and magnetized along its axis of rotation, and which is mounted in a position which is coaxial with the axis of the rotor.

The rotor armature of the earlier application included a winding of the series-wave type distributed over the two faces of a thin supporting disc, the outer and inner parts of which supported conductor parts forming the end-connections of the winding turns. However, since the complete disc and winding was located entirely within the annular air-gap of the machine, the conductor parts constituting these end-connections were superfluous for the operation proper of the magnetic fluxes of the machine.

On the other hand, the annular portion of the disc covered by these end-connections contributed to the overall inertia of the rotating part of the machine.

It is a further object of the invention to form at least the outer end-connections of the winding turns over a thin dielectric ring arranged outside the air-gap proper while the rigid rotor disc supports only the useful part of the winding of an outer diameter which at the utmost is only equal to that of the polar piece ring of the stator member of the machine.

These and other objects of the invention will be more fully explained with reference to the accompanying drawings.

Both arrangements are only examples of stator and rotor members of a machine illustrating the invention. Alternative shapes remain within the scope and spirit of the invention.

Figure 1:
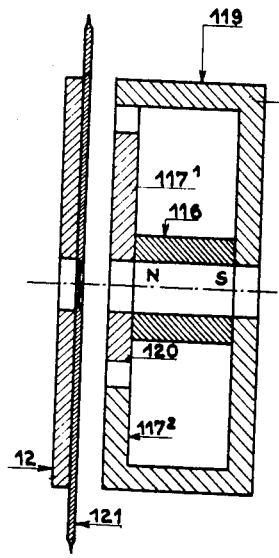
FIG. 1 shows a lateral view in cross section.
Figure 2:
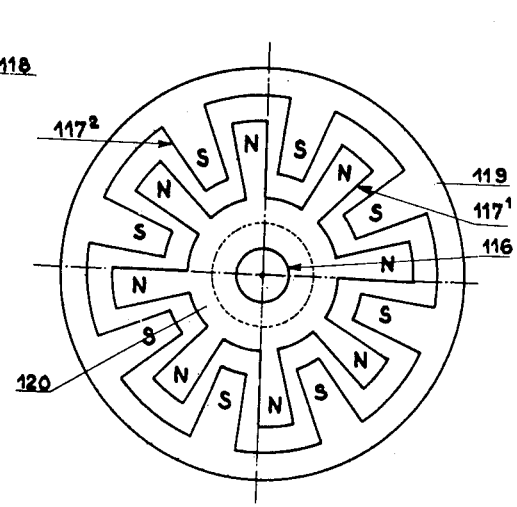
FIG. 2 shows a corresponding front view of an inductor member embodying certain features of the invention.

In FIGS. 1 and 2, a toroidal or tubular permanent magnet is shown at 116. As stated above it is magnetized along its axis of rotation. For instance, the end facing the air-gap presents the N pole, and the opposite end, the S pole.

Annular magnet 116 is connected at one end to a plate 118 forming a yoke and provided with a cylindrical flange 119 carrying inwardly directed pole pieces $117^2$ in a plane aligned with polar pieces $117^1$ cut in another plate 120 forming a yoke for the other pole of the magnet 116.

Pole pieces $117^1$ and $117^2$, as shown in FIG. 2, are so cut as to interleaf regularly in the plane of the ring formed by them in front of the air-gap. Furthermore, they are so designed as to provide substantially radial edges. The annular surface defined by the outer faces of pole pieces $117^1$ and $117^2$ defines the useful area of the air-gap of the rotating machine. This air-gap is formed between the ring of stator poles and the armature disc 12 which may be magnetic and which carries the armature winding on its inner face.

Figure 4:
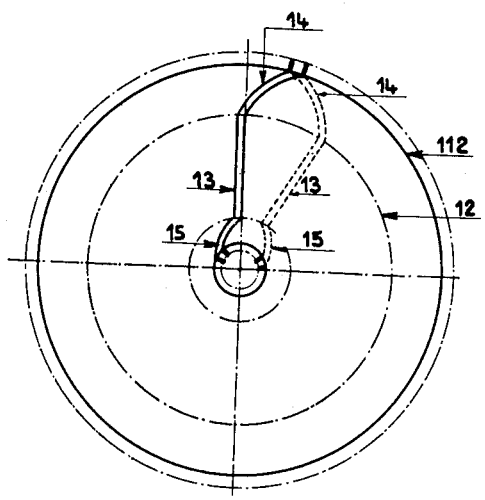
FIG. 4 shows a corresponding front view of a rotor member embodying certain features of the invention.

As shown in FIGURE 4, and as more fully disclosed in my copending application, the armature winding is "printed" on both faces of a thin dielectric sheet 112, one half of each turn being formed on one face of the sheet and the other half on the opposite face. Each half-turn comprises a middle portion 13, which is formed substantially radially of disc 112, and two end-portions 14 and 15 which are slanted or inclined to portion 13 and which form the end-connections between conductors on opposite faces of the disc. A single turn of the winding is represented in FIGURE 4.

Figure 3:
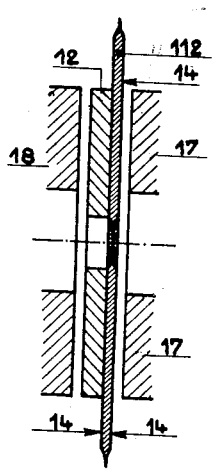
FIG. 3 shows a lateral view in cross section.

In FIGS. 3 and 4, annular disc 12, schematically indicated, supporting the winding of the rotor, is of same internal and external diameters as the yoke members 17 forming the ring of pole pieces (indicated in FIGS. 1 and 2 at $117^1$, $117^2$) of the inductor member, while magnetic ring 18 of FIGURE 3 serves to close the magnetic flux lines on the other side of the rotor, that is, ring 18 provides a return path for flux passing from one pole to adjacent pole.

The diameter of supporting disc 12 is then reduced to the strictly useful diameter. As shown in FIGURE 4, the radial width of annular disc 12 is co-extensive with the straight portion 13 of an armature conductor.

On the other hand, as apparent from FIG. 4, the outer end-connections of the winding turns formed of conductor portions 14 are located on an outer peripheral annular portion of dielectric sheet 112, which portion extends out of the air-gap and contributes substantially no inertia to the overall inertia of the rotor.

In the embodiment illustrated, the entire winding is shown to be "printed" over both faces of sheet 112 which consists for instance of the type of material commercially known as "Mylar" of a thickness of the order of four hundredths mm., a thickness which has been found sufficient to make the completed winding-mylar unit stand by itself. During the rotation of the machine of course the self-supporting character of this unit will be enhanced on the free annular portion bearing the outer end-connections of the winding turns.

Member 12 is "glued" to the face of disc 112 with any suitable thermosetting plastic glue. Disc 112 itself is made of rigid material such as hard plastic or a glasslike substance.

I claim:
1. A field structure for a multi-pole dynamo-electric machine of the axial air-gap type comprising a series of magnetic pole pieces equally spaced about a circular path and connected together by a magnetic yoke, a second series of magnetic pole pieces spaced about said circular path within the spaces between the poles of said first series of pole pieces and being connected together by a second magnetic yoke, the poles of both series having flat pole faces lying in a common radial plane and defining a flat annular pole area, and means for magnetizing said magnetic yokes in opposite polarity from a common source of magnetic flux.

2. A field structure according to claim 1 wherein one of said yokes comprises a disc having outwardly extending radial projections forming one series of said pole pieces, and the other yoke comprises a second disc mounted in spaced parallel relation with, and on a common axis with, said first disc, the second series of pole pieces being supported from the periphery of said second disc but in off-set relation thereto, and said magnetizing means comprises a cylindrical magnetizing member polarized along its length and inter-connecting said discs at their centers.

3. A field structure according to claim 1 wherein one of said yokes comprises a flat disc of magnetic material having radially extending projections forming one series of said pole pieces, and the second yoke comprises a ring of magnetic material surrounding the radial projections on said disc and having inwardly directed radial projections forming the second series of pole pieces.

4. An electric motor having a field structure according to claim 1 and including a plate of magnetic material arranged in front of said annular pole area to provide a narrow air-gap between said pole pieces and said plate, and a disc-type of armature winding mounted within said air-gap and being rotatable about the axis of said pole area.

5. A motor according to claim 4, wherein said magnetic plate comprises a disc mounted for rotation about the axis of said pole area and said winding is carried by said disc.

6. Combination according to claim 5, wherein the said winding is made of two sets of half-turn conductors formed on opposite faces of a thin disc of dielectric material, each half-turn conductor comprising a substantially radially extending mid-portion and integral slanted end portions at the ends of which face-to-face interconnections are made to conductors on the opposite face of the dielectric disc, said winding member being affixed to the said supporting disc of magnetic material.

7. A motor according to claim 5 wherein said magnetic disc has an outer diameter substantially equal to the outer diameter of said annular pole area, and the other ends of the conductor mid portions are located on a circle of diameter substantially equal to the diameter of said magnetic disc, said dielectric disc having an outer peripheral portion extending beyond said magnetic disc and carrying the slanted outer end portions of said conductors which form end-connections for the turns of said winding.

8. A motor according to claim 4 wherein said magnetic plate is stationary and said armature winding is carried by a rotary disc mounted within said air-gap.

9. A field structure for a multi-pole dynamo-electric machine of the axial air-gap type comprising a series of magnetic pole pieces equally spaced about a circular path and connected together by a magnetic yoke, a second series of magnetic pole pieces spaced about said circular path within the spaces between the poles of said first series of pole pieces and being connected together by a second magnetic yoke, the poles of both series having flat pole faces lying in a common radial plane and defining a flat annular pole area, means for magnetizing said magnetic yokes in opposite polarity from a common source of magnetic flux, and a plate of magnetic material arranged in front of said annular pole area to provide a narrow air-gap between said pole pieces and said plate.

References Cited in the file of this patent
UNITED STATES PATENTS

| | | |
|---|---|---|
| 2,508,524 | Lang | May 23, 1950 |
| 2,579,318 | Hershberger | Dec. 18, 1951 |
| 2,740,110 | Trimble | Mar. 27, 1956 |
| 2,773,239 | Parker | Dec. 4, 1956 |

UNITED STATES PATENT OFFICE
CERTIFICATE OF CORRECTION

Patent No. 3,056,058                                                     September 25, 1962

Jacques Henry-Baudot

It is hereby certified that error appears in the above numbered patent requiring correction and that the said Letters Patent should read as corrected below.

Column 2, line 47, before "adjacent" insert -- an --; column 4, line 10, for "other" read -- outer --.

Signed and sealed this 5th day of February 1963.

(SEAL)
Attest:

ERNEST W. SWIDER
Attesting Officer

DAVID L. LADD
Commissioner of Patents